Jan. 30, 1940.　　　　　F. G. YANES　　　　　2,188,697
METHOD OF BRIGHTENING THE COLORS IN THE SUBTRACTIVE
SYNTHESIS OF COLOR PHOTOGRAPHY
Filed July 8, 1936
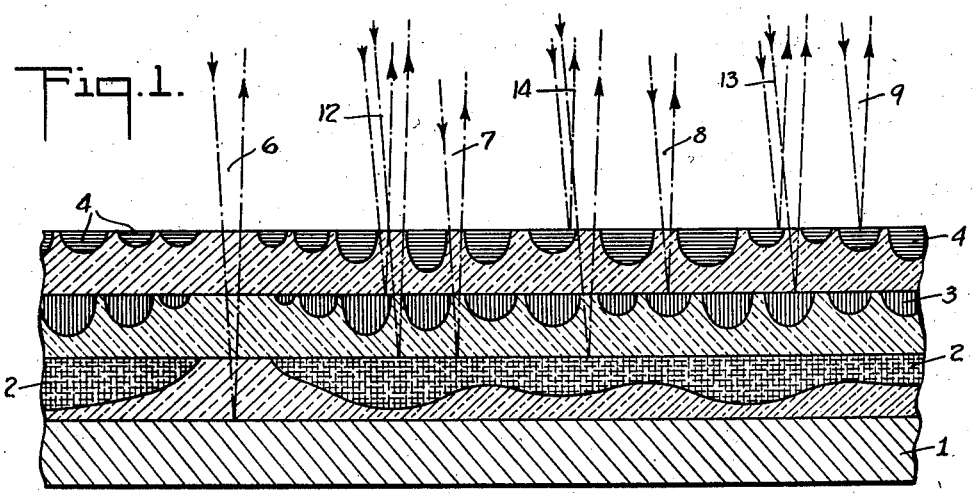
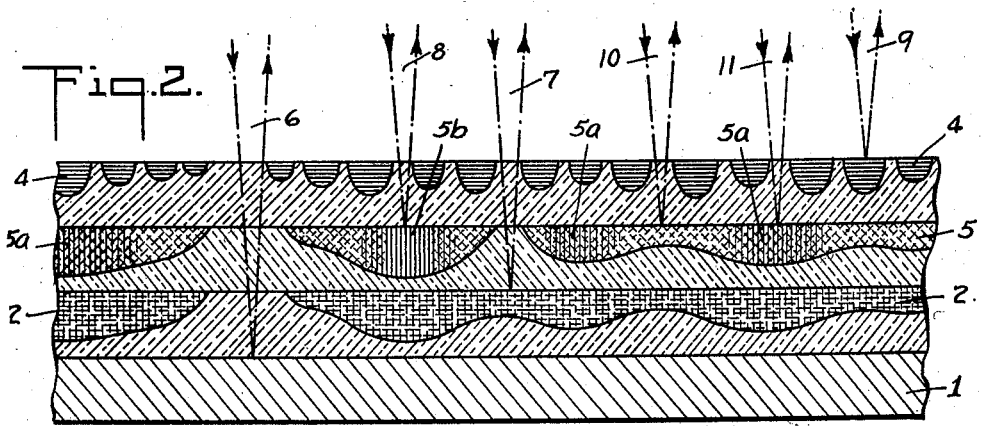
INVENTOR
(F. G. YANES)

Patented Jan. 30, 1940

2,188,697

UNITED STATES PATENT OFFICE 2,188,697

METHOD OF BRIGHTENING THE COLORS IN THE SUBTRACTIVE SYNTHESIS OF COLOR PHOTOGRAPHY

Francisco G. Yanes, New York, N. Y., assignor, by direct and mesne assignments, of thirty per cent to Tomas Pacanins, New York, N. Y., and fifteen per cent to Florencio Gomez, Trujillo City, Dominican Republic Application July 8, 1936, Serial No. 89,502

2 Claims. (Cl. 95—2)

My invention consists in a method of brightening the colors produced by pigments in the subtractive synthesis and the example adopted to demonstrate such method relates to improvements in color pictures made by assembling complementary colored images upon a white reflecting surface; the purpose of the invention is to eliminate the excess of absorption caused by the usual colored transparencies which, when assembled, act as a combination of filters; the principle involved in the example of the invention is that color filters, especially when combined, comparatively absorb much more light than color objects; and the improvements in the result are such that can be even attained, as in the example, when substituting combined color transparencies,—or light transmitting assembled elements—by opaque or light reflecting individual, minute areas, so arranged as to contribute to the chromatic synthesis by direct reflection. This effect is obtained by producing for the synthesis part images in which the tones corresponding to the actual colors are broken and permit one image to show through another.

The improvement obtained by this method of producing pictures is herein applied to pictures to be examined by reflected light and by using pigments of low transmission in order to gain the brilliancy of their greater reflecting power. But it is obvious that the same method could be applied to part images to be examined by transmitted light or colored with pigments of better transmission as long as there will always be a great improvement in the result. A single, color light transmitting, minute area, backed by a white reflecting support or fully illuminated, when combined with a similar minute area of another color, side by side, will furnish an additive effect of combined colors of greater brilliancy than the subtractive effect obtained when said minute areas are superimposed.

In the usual method the white surface acts as the illuminant and reflects the light transmitted by the color transparencies, which causes a great loss of light. It is well known that the combined transmission of assembled filters is equivalent to the product of their individual transmission, which is a fraction; if a filter transmits, for instance, 10% of a radiation and another filter transmits 40%, the two together will transmit only 4%; then the whitest surface never reflects more than 80% of the incident light and white paper sometimes even absorbs 40%. If it is considered that the incident light passes twice through the colored transparencies, before and after being reflected, the excess of absorption is quite evident. Such loss of light is counteracted in practical work by using very thin images for the synthesis; but the colors thus obtained are degenerated to a faint aquarelle sort of tint or, when more saturated, produce some kind of greyish fog or general darkness all over the picture.

When instead of filters, color surfaces are considered, the situation is different; a red object almost reflects 100% of red light, and a yellow object as much if not more red and green light than objects of those colors. According to the present example of the invention the brilliancy of a color is increased by using, instead of a light transmitting colored image, an image transformed into color reflecting areas; and the general brightness of the picture will depend upon the number of these light reflecting images combined in the synthesis. In this case the white reflecting support merely supplies the whites and tone values, the last in combination with the opaque particles of color matter.

Regarding the drawing:

Fig. I is a section of a color picture showing the synthesis of colors by reflection.

Fig. II presents another form.

In Fig. I: 2 is an opaque yellow image in a thin layer of a transparent photographic material; 3 is an opaque magenta image in another layer; and 4 an opaque blue-green image in a third layer; these layers are assembled with their images in registration upon the white reflecting support 1. In this form of the synthesis, the images 3 and 4 have been broken into minute areas, as for instance, by interposing a screen in manner known to the art when printing the black and white color-value images; this permits the showing of underneath images and the synthesis is obtained by a sort of pointillist effect. Some reflections and combination of colors by the acting of the incident light are shown in 8 magenta, 9 blue, 7 yellow, 12 orange, 13 violet, 14 green, 6 white.

In Fig. II: a similar section is shown in which only the opaque blue-green top image 4 is broken. The image 5 is a duo tone red-orange opaque image in which the heavier tones 5a, 5b are reds and the half tones 5 orange; in this image the common parts of the magenta and yellow images are already combined; the yellow image 2 showing only in the lighter tones. Under this arrangement, the picture is as brilliant as in the one described in Fig. I, but the drawing has gained by the fact that only the upper image is broken. The warm colors and combinations already formed reflect the incident light producing in 5a red-orange, in 5b deep red, in 5 orange. Other colors 9 blue-green, 6 white, 7 yellow, etc., are produced as in Fig. I.

In the illustrated arrangements three color images are considered, but it is obvious that the same method of producing the synthesis by direct reflection can be applied in two color separation, and the bi-color opaque red-orange image 5 shown in Fig. II may be used for the purpose. In the same arrangements the images have been described as held in transparent layers, but one of these layers may have been coated on a white nonexpanding support and be used for the lower image. The images have been also described as opaque, which does not mean a muddy patch of color but tone values produced by particles of opaque, light reflecting color matter, which however, would not render a good color effect by transmitted light or projection on a screen. In other words, the opacity of the images must not be absolute, obviously because the blacks and grays could not be then subtractively produced. Regarding the white reflecting base it could be substituted by a buff or other pale color surface to obtain a desired effect.

For the practicing of the method, color separation negatives are first obtained by well known means and color-value positives printed from them on a photographic emulsion coated on a very thin transparent support. When the arrangement adopted calls for the breaking of a given image the same is printed through a screen of very fine grain in manner known to the art and reduced if necessary to ensure clear separations of the minute areas. When not, the positives are printed as usually. For the toning of the yellow, magenta and blue-green images well known formulas can be used, as for example: the chromate of lead toning for the yellow, which comprises a previous bleaching to ferrocyanide of lead followed by immersion in a bichromate solution; for the magenta, the carmine color obtained by toning a bromide print previously sulphided in a chloride of gold and sulphocyanate of potassium bath; and for the blue, when opaque, a previous bleaching to ferrocyanide of lead, and when transparent to ferrocyanide of silver, followed by an acid and diluted solution of ferric chloride; fixing, washing, reducing being also steps of these well known toning operations. Other known formulas can also be used, as the mercuric-potassium iodide for the yellow, the sodium selenosulphate for the magenta and several iron combinations for the blue-green.

Regarding the bi-color, opaque, red-orange image, I found that by adding to the developer a solvent of the silver halide as ammonium bromide and carbonate, the positive, after sulphided and toned, in the gold-chloride and sulphocyanate bath, showed a duo-tone where the denser parts remained more or less unaltered, while the half and lighter tones became orange. By applying the same treatment to a positive printed in a chlorobromide emulsion, a redder tone substituted the carmine of the heavier tones and oranges and even yellows showed in the lighter tones. The opaque image thus resulting showed a complete scale of warm colors and was complementary to the blue-green image.

This duo-tone red-orange image can be obtained by printing the positive on a chlorobromide emulsion and developing it in an ordinary amidol and sodium sulphite developer; the sulphite, being a solvent of the chloride of silver, will be assisted by adding one, two or more c. c. —according to the desired result—of a 5% solution of ammonium bromide and carbonate for every 100 c. c. of developer.

One of the advantages of the method described, outside of the brightness of the colors, is that the important red-orange combination is not produced by fading dyestuffs but by converting the image into sulphide of gold, which is fast to light, atmospheric conditions and many reagents; and so, the whole picture can be regarded as permanent.

Considering the prior art I wish to state that I do not pretend any invention in the method in general of combining subtractive part images but in the step of breaking the tones corresponding to the colors in said images to obtain a better blending with the possibility of using pigments of low transmission and corresponding greater reflecting power when said part images are colored and assembled upon a white reflecting surface.

After having described to the best of my knowledge the new method I wish to be understood that the present disclosure is for the purpose of illustration only and that my invention includes any equivalents of variations which fall within the scope of the appended claims.

I claim:

1. As a new article of manufacture, a color picture of an object comprising an opaque whitish reflecting support bearing, superimposed in register upon one of its surfaces, a plurality of layers containing colored positive images of said object, said images in the several layers being of subtractively-complementary colors and consisting of particles of opaque light-reflecting color matter, the image in the layer in immediate contact with the support consisting of an unscreened continuous-tone image and the image in at least one other layer consisting of an image having its tones broken into clearly separated minute areas, said broken-tone images permitting the showing of images underneath and producing a sort of pointillist effect.

2. The method of producing a color photograph of an object comprising making a set of continuous-tone color-separation negatives from said object, producing a continuous-tone positive by printing through one of said negatives, producing a broken-tone positive by printing another of said negatives through a screen of very fine grain, producing positives by printing through any and all other negatives of the set, converting said positives to a corresponding set of layers containing images colored substractively-complementary by particles of opaque, light reflecting color matter, assembling the color-image layers in register upon an opaque whitish reflecting support by placing the continuous-tone image in immediate contact with the support and by superimposing the broken-tone image last of all upon all the other layers.

F. G. YANES.